United States Patent [19]
Tsuda

[11] Patent Number: 6,144,963
[45] Date of Patent: Nov. 7, 2000

[54] APPARATUS AND METHOD FOR THE FREQUENCY DISPLAYING OF DOCUMENTS

[75] Inventor: Hiroshi Tsuda, Kawasaki, Japan

[73] Assignee: Fujitsu Limited, Kawasaki, Japan

[21] Appl. No.: 08/971,922

[22] Filed: Nov. 18, 1997

[30] Foreign Application Priority Data

Apr. 9, 1997 [JP] Japan ................................. 9-090385

[51] Int. Cl.[7] .................................................. G06F 17/30
[52] U.S. Cl. ........................... 707/10; 707/200; 707/526
[58] Field of Search .................................. 707/526, 514, 707/518, 528, 10, 200, 213, 216, 147

[56] References Cited

U.S. PATENT DOCUMENTS

| 5,499,330 | 3/1996 | Lucas et al. | 707/514 |
|---|---|---|---|
| 5,623,652 | 4/1997 | Vora et al. | 707/10 |
| 5,873,110 | 2/1999 | Toyosawa et al. | 707/518 |
| 5,893,130 | 4/1999 | Inoue et al. | 707/528 |
| 5,903,904 | 5/1999 | Peairs | 707/526 |
| 5,909,690 | 6/1999 | Tanigawa et al. | 707/526 |
| 5,933,843 | 8/1999 | Takai | 707/526 |
| 5,937,160 | 8/1999 | Davis et al. | 709/203 |
| 5,991,780 | 11/1999 | Rivette et al. | 707/512 |

OTHER PUBLICATIONS

A, Voss, Nakata, K. and Juhnke, M., "Concepts as Knowledge Handles in Collaborative Document Management," IEEE Conference Proceedings, pp. 245–251, Jun. 16, 1999.

*Primary Examiner*—Hosaint T. Alam
*Assistant Examiner*—Ella Colbert
*Attorney, Agent, or Firm*—Staas & Halsey LLP

[57] ABSTRACT

A document display apparatus, method, and storage medium for realizing the apparatus and method extract data information relevant to each document of a plurality of electronic documents, count the number of the relevant documents in a given unit of time based on the extracted date information, and display the number of the counted documents and frequency information about a document containing visual information obtained based on the number of the documents in a given unit of time. A date is extracted by performing a pattern matching for a predetermined date expression. A unit of counting a frequency can be a year, month, day-of-week, or day. The visual information can be displayed by changing a color, brightness, and size of symbols or graphics depending on an intensity level obtained by normalizing a frequency. The distribution of date information contained in a plurality of electronic documents in a given unit of time can be easily obtained through a visual expression.

34 Claims, 20 Drawing Sheets

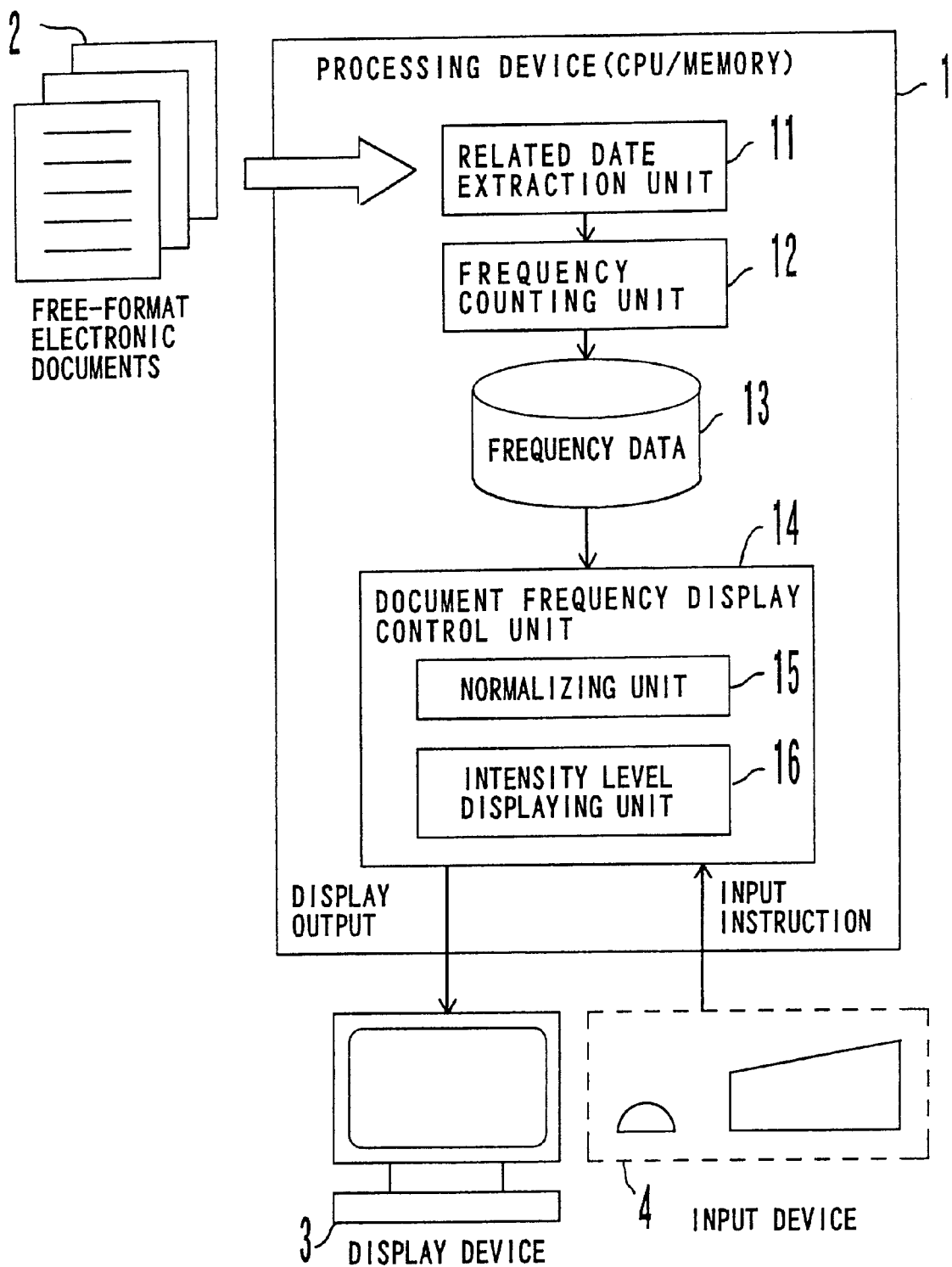
F I G. 1

```
23 March 1996          (BASE)
24 Mar. 1996           (MONTH IS ABBREVIATED)
23 March 96            (2 LOWER DIGITS INDICATE YEAR)
23 March '96           (' AND 2 LOWER DIGITS INDICATE YEAR)
15th May 1996          (DAY ENDS WITH st, nd, rd OR th)
17th of May in 1996    (PREPOSITIONS SUCH AS of, in, ETC. ARE EMBEDDED)
Thu, 11 May 1995       (DAY-OF-WEEK IS ADDED, BUT IGNORED HERE
23 March               (YEAR IS OMITTED)
```

FIG. 4A

```
September 2, 1996      (BASE)
Sep, 3, 1996           (MONTH IS ABBREVIATED)
September 2, 96        (2 LOWER DIGITS INDICATE YEAR)
September 2, '96       (' AND 2 LOWER DIGITS INDICATE YEAR)
May 16th, 1996         (DAY ENDS WITH st, nd, rd OR th)
September 2 in 1996    (PREPOSITIONS SUCH AS in ARE EMBEDDED)
September 2            (YEAR IS OMITTED)
```

FIG. 4B

```
22-25 September 1997        (BASE)
January 11-12, 1997         (BASE)
January 13 -- 14, 1997      (... IS DELIMITER)
Jan. 26 - Feb. 10, 1997     (SPANNING TWO MONTHS)
Dec. 27, 1996 - Jan. 14, 1997   (SPANNING TWO YEARS)
```

FIG. 4C

```
平成 8 年 6 月25日        (BASE)
平 8 年 6 月25日          (PERIOD NAME IS ABBREVIATED)
1996（平成 8）年10月17日  (COMBINATION OF GENERAL CALENDER YEAR AND
                          JAPANESE PERIOD NAME)
H7.3.4                   (JAPANESE PERIOD NAME IS ABBREVIATED, AND
                          '.' IS DELIMITER)
H8-4-5                   (JAPANESE PERIOD NAME IS ABBREVIATED, AND
                          '-' IS DELIMITER)
H8/4/6                   (JAPANESE PERIOD NAME IS ABBREVIATED, AND
                          '/' IS DELIMITER)
```

F I G.  5 A

```
1996年10月17日    (BASE)
1996年10月17日    （木）(DAY-OF-WEEK IS ADDED, BUT IGNORED HERE)
96年10月17日      (2 LOWER DIGITS INDICATE YEAR)
 6月29日          (YEAR IS OMITTED)
```

F I G.  5 B

```
平成 8 年10月 2 〜10日
平成 8 年10月 2 日〜10日
平成 8 年10月25日〜11月10日
平成 8 年12月25日〜平成 9 年 1 月10日
1995（平成 7）年10月31日（木）〜11月 1 日（金）
```

F I G.  5 C

```
平成 8 年 2 月末      (LAST DAY OF MONTH)
平成 8 年 2 月中旬    (ASSUED TO BE 15TH, SIMILARLY, BEGINNING IS ASSUMED
                      TO BE 5TH, AND END IS ASSUMED TO BE 25TH)
```

F I G.  5 D

96/7/1          (JULY 1, 1996)
1996/7/3        (JULY 3, 1996)
96/7/6 - 8      (JULY 6, 1996 TO JULY 8, 1996)
96/7/5 - 8/13   (JULY 5, 1996 TO AUGUST 13, 1996)
96.6.3          (JUNE 3, 1996)
8/18            (AUGUST 18, YEAR CAN BE COPIED FROM PREVIOUS PATTERN, OR ENTER CURRENT YEAR)
8/5—9           (AUGUST 5 TO AUGUST 9, YEAR CAN BE COPIED FROM PREVIOUS PATTERN, OR ENTER CURRENT YEAR)
8/5—9/14        (AUGUST 5 TO SEPTEMBER 14, YEAR CAN BE COPIED FROM PREVIOUS PATTERN, OR ENTER CURRENT YEAR)
3/5             (MARCH 5 OR MAY 3)
1996-8-6        (AUGUST 6, 1996)
960821          (AUGUST 21, 1996)
19960822        (AUGUST 22, 1996)

F I G. 6

```
\day   ::= 1 | 2 | ····· | 31
\month   ::= Jan. | January | Feb. | February ···· | December
\th  ::= st | nd | rd | th
\year   ::= \year4 | \year2
\year2 ::= 1 | 2 | ···· | 98 | 99
\year4 ::= 1 | 2 | ···· | 9998 | 9999
\gengo ::= 平 | 平成 | H | 昭 | 昭和 | S | ···· | 明治 | M
```

F I G. 8

```
ENGLISH(A)
PATTERN                                    G1Y1M1D1
─────────────────────────────────────────────────────────
(\day) (\month) (\year)                    - 3 2 1
(\day) (\month) '(\year2)                  - 3 2 1
(\day)\th (\month) (\year)                 - 3 2 1
(\day)/th of (\month) in (\year)           - 3 2 1
(\day) (\month)                            - - 2 1

ENGLISH(B)
PATTERN                                    G1Y1M1D1
─────────────────────────────────────────────────────────
(\month) (\day), (\year)                   - 3 1 2
(\month) (\day), '(\year2)                 - 3 1 2
(\month) (\day)\th, (\year)                - 3 1 2
(\month) (\day)\th in (\year)              - 3 1 2
(\month) (\day)                            - - 1 2

ENGLISH(C)
PATTERN                                    G1Y1M1D1    G2Y2M2D2
─────────────────────────────────────────────────────────────────
(\day)-(\day) (\month) (\year)             - 4 3 1     - 4 3 2
(\day) (\month)-(\day) (\month) (\year)    - 5 2 1     - 5 4 3
(\day) (\month) (\year) -
        (\day) (\month) (\year)            - 3 2 1     - 6 5 4
(\month) (\day)- (\day), (\year)           - 4 1 2     - 4 1 3
(\month) (\day)-(\month) (\day), (\year)   - 5 1 2     - 4 3 4

JAPANESE(A)
PATTERN                                    G1Y1M1D1
─────────────────────────────────────────────────────────
(\gengo) (\year) 年 (\month)月 (\day)日     1 2 3 4
(\gengo) (\year) [.-/] (\month) [.-/] (\day)日  1 2 3 4

JAPANESE(B)
PATTERN                                    G1Y1M1D1
─────────────────────────────────────────────────────────
(\year) 年 (\month)月 (\day)日              - 1 2 3
(\month)月 (\day)日                         - - 1 2

JAPANESE(C)
PATTERN                                    G1Y1M1D1    G2Y2M2D2
─────────────────────────────────────────────────────────────────
(\gengo) (\year) 年 (\month)月 (\day)~(\day)日   1 2 3 4    1 2 3 5
(\gengo) (\year) 年 (\month)月 (\day)日~
        (\month)月 (\day)日                 1 2 3 4     1 2 4 5

OTHER DATE
PATTERN                                    G1Y1M1D1    G2Y2M2D2
─────────────────────────────────────────────────────────────────
(\year)/ (\month)/(\day)                   - 1 2 3
(\month)/(\day)                            - - 1 2
(\year)- (\month)-(\day)                   - 1 2 3
```

FIG. 9

$$red(e) = \begin{cases} 0, & \text{for } e =< 0.5 \\ 256(e - 0.5)/0.5, & \text{for } 0.5 < e \end{cases}$$

$$green(e) = \begin{cases} 256e/0.4, & \text{for } e =< 0.4 \\ 256, & \text{for } 0.4 < e < 0.75 \\ 256(1 - e)/0.25, & \text{for } 0.75 =< e \end{cases}$$

$$blue(e) = \begin{cases} 256, & \text{for } e =< 0.25 \\ 256(0.5 - e)/0.25, & \text{for } 0.25 < e < 0.5 \\ 0, & \text{for } 0.5 =< e \end{cases}$$

FIG. 11

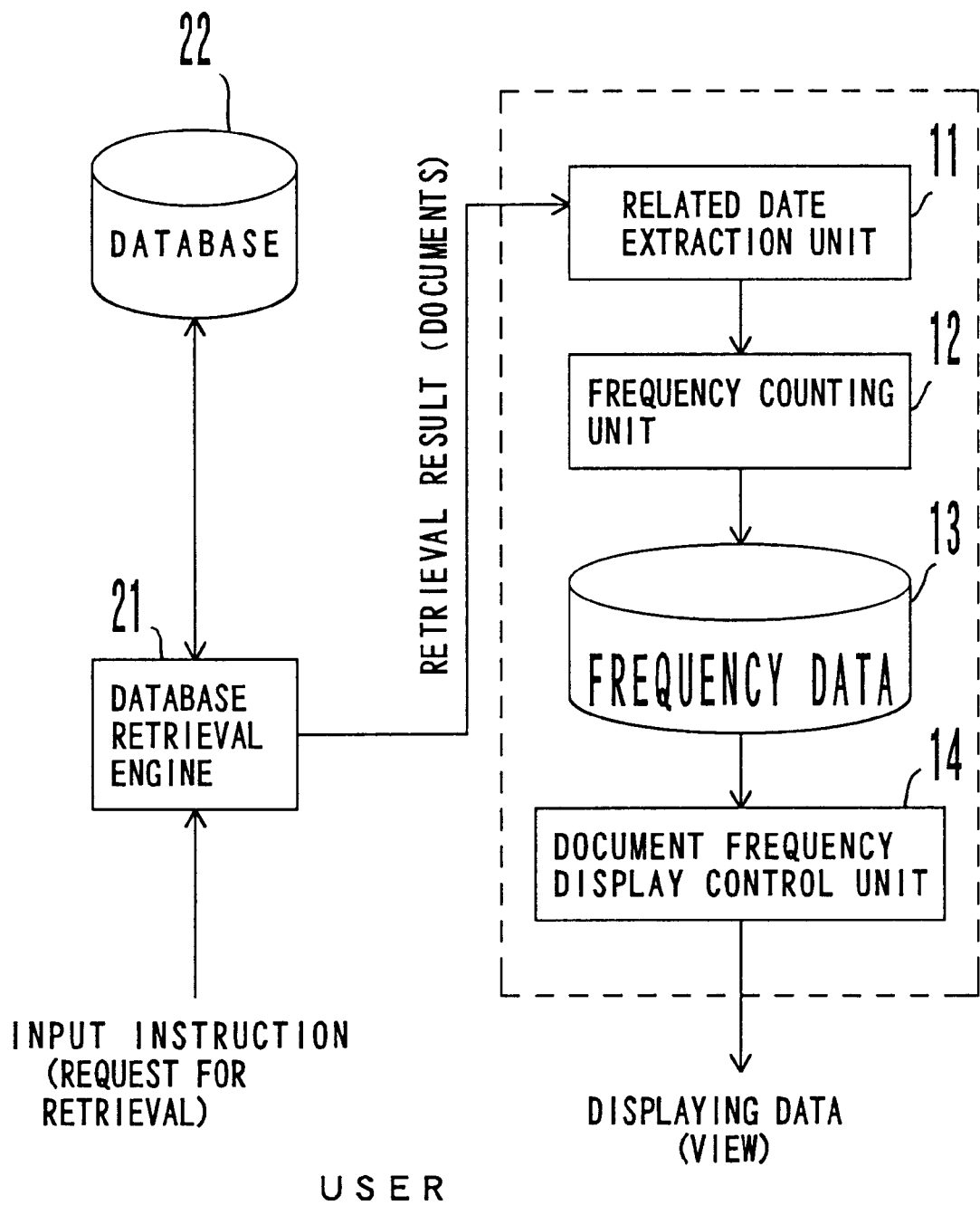
F I G. 1 7

FIG. 18

TOP 100 CASES ARE DISPLAYED AS A RESULT OF RETRIEVING "FOOD POISONING"

| YEAR/MONTH | 1 | 2 | 3 | 4 | 5 | 6 | 7 | 8 | 9 | 10 | 11 | 12 | TOTAL |
|---|---|---|---|---|---|---|---|---|---|---|---|---|---|
| 9 0 | ☐1 | | | | | | | ☐1 | ▦5 | ☐1 | ☐1 | | 1 0 |
| 9 1 | ☐1 | ☐1 | | ☐1 | | ▦3 | ☐2 | ▦3 | ☐1 | ☐1 | | | 1 3 |
| 9 2 | ☐1 | ☐1 | | | ▦4 | ☐1 | | | ☐1 | ☐2 | | ☐1 | 1 2 |
| 9 3 | | | ☐1 | ☐1 | ☐1 | ▦3 | ▦3 | ▦3 | ■8 | ▦6 | ☐1 | | 2 4 |
| 9 4 | | | | | | | ■10 | ▦5 | ■10 | ☐1 | | ☐2 | 3 5 |

RETRIEVAL IN BOOLEAN OPERATION (AND)

RETRIEVAL IN BOOLEAN OPERATION (OR)

(ADDING RANIKING CONDITION) (CLEAR)

LIMITATION :

| NUMBER | 9 0 | 9 1 | 9 2 | 9 3 | 9 4 | |
|---|---|---|---|---|---|---|
| 428334 | 8/28 | | | | | 105 CHILDREN SUFFER FROM FOOD POISONING IN PRIMARY SCHOOL IN KITA-KU, TOKYO, POSSIBLY BY EATING SCHOOL LUNCH. |
| 118596 | | 5/7 | | | | FUKUOKA PREFECTURE ISSUES URGENT CAUTION AGAINST FOOD POISONING |
| 270328 | | | 6/26 | | | NAGOYA CITY ISSUES CAUTION AGAINST FOOD POISONING |

PLACE :

FIG. 19

A TOTAL OF 17 CASES HAVE BEEN RETRIEVED AS A RETRIEVAL RESULT
IN BOOLEAN OPERATION ON "HIGHWAY AND CONGESTION" IN APRIL, 1990.

| SUN | MON | TUE | WED | THR | FRI | SAT |
|-----|-----|-----|-----|-----|-----|-----|
|     |     |     | 1   | 2   |     |     |
| 2   | 9☐1 | 3▨2 | 11  | 5   | 6   | 7☐1 |
| 8   | 16☐1| 10  | 18  | 12☐1| 13  | 14▨2|
| 15  | 23  | 17  | 25☐1| 19  | 20☐1| 21  |
| 22  | 30  | 21☐1| 26  |     | 27  | 28■6|
| 29  |     |     |     |     |     |     |

EASING
RETRIEVAL
CONDITIONS :   HIGHWAY
               CONGESTION
               STATUS
                 9 0 . 4

(RESTARTING RETRIEVAL)   (RESET)

RANKING RETRIEVAL

| DATE    | NUMBER | TITLE |
|---------|--------|-------|
| 3 (TUE) | 40490  | POLICE OF OSAKA PLANS TO DISPLAY "△ MINUTES TO ○○ INDICATING TIME REQUIRED TO REACH DESTINATION THROUGH NEW BROAD TRAFFIC INFOMATION NETWORK |
|         | 40502  | POLICE OF OSAKA DISPLAYS TIME REQUIRED TO REACH DESTINATION USING NEW GENERATION TYPE ROAD CONTROL APPARATUS |
| 7 (SAT) | 40701  | 2 PERSONS WERE INJURED IN CONTINUOUS CRASHES ON MEISHIN AND KINNKI HIGHWAYS |

APPARATUS AND METHOD FOR THE FREQUENCY DISPLAYING OF DOCUMENTS

BACKGROUND OF THE INVENTION

1. Field of the Invention

The present invention relates to a document display apparatus for appropriately arranging and displaying a plurality of documents written in different formats, and more specifically to an apparatus and method for appropriately arranging and displaying the distribution of occurrences of documents in the format of a plurality of time elements such as year/month/day of week/day, and also to a program storage medium for realizing the document display apparatus.

With a remarkable development of personal computers and network communications, electronic documents transmitted among users such as text files, electronic mail, news data (for example, network news data) distributed through a network have strikingly increased both in variation and volume. Under the situation, there is a strong demand for a technology of arranging and displaying these documents based on the contents of the documents.

Most of these documents contain information about the date and time (date information) relating to the document including the information date for a lecture meeting, the deadline of scripts, etc.

2. Description of the Related Art

The present invention generally relates to a data visualizing technology. Conventionally, data have been visualized on formatted information such as a database, etc. Formatted information can be easily processed to visualize desired data by retrieving a specified field and combining it with existing graphing software, etc.

However, documents for text files, electronic mail, network news, etc. are not always stored in a specified format. The operating system allows information such as a file name, a file size, a generation date, an author, etc. to be added as file attributes to the document. However, this is not enough to indicate the contents of a document. For example, if there is a document informing us of a lecture meeting, the date of the lecture meeting cannot be obtained until the document is actually read.

Furthermore, with an explosive increase of free-format document information transmitted through the Internet, etc., a technology of searching the entire document using a character string such as a search engine of the Internet is demanded. However, a desired document cannot always be obtained by detecting a specified character string in the document. That is, a retrieval result may contain noises, i.e. unwanted information.

Additionally, since there are a large volume of documents to be searched and similar words are retrieved after being OR-processed to reduce mis-retrieval, the amount of searched documents is very large. Thus, the technology of visualizing data is earnestly demanded in retrieving effective information from a large volume of noisy retrieval results.

In the circumstances, there have been no method or apparatus for visualizing information in a comprehensible manner by displaying, based on the contents of various documents, when an event frequently occurs and how the occurrence of the event changes depending on the year/month/day of the week/day.

As described above, there has been a technology of retrieving a specified event from various documents, but has never been an apparatus for visualizing frequency information about documents. It is considered that statistically effective information can be obtained by observing a specified event in a large volume of document information if data is output as to, for example, in what month food poisoning frequently occurs, or on what days of the week a larger number of traffic accidents take place.

Based on the above described problems and information, the present invention has been developed to solve the following problems.

1. In the prior art technology, a free-format document can only be recognized by a file attribute (a file name, a file size, and an update date), and information should be contained in a document or added to a document in a specific format in order to recognize the document by its contents.

2. The date information relating to a free-format document can only be obtained by actually reading the contents of the document.

3. The distribution of the date information about a document cannot easily be obtained at predetermined time intervals.

SUMMARY OF THE INVENTION

The present invention aims at solving the above described problem, arranging and displaying in a comprehensible manner the distribution of occurrences of electronic documents in the format of a plurality of time elements such as year/month/day of week/day.

The present invention includes a processing device having a CPU, memory, etc.; a group of free-format electronic documents; a display device; an input device such as a keyboard, a mouse, etc.; a relevant date extraction unit; a frequency counting unit; a frequency data; a document frequency display control unit; a normalizing unit; and an intensity level displaying unit.

The relevant date extraction unit automatically extracts the date information about a document from the contents of the document through pattern matching. The frequency counting unit obtains the frequency data by counting the number of relevant documents for each date. The document frequency display control unit emphasizes and displays the document frequency for each date using an output unit such as the display device, etc.

In this example, frequency or document frequency refers to the number of documents, etc. whereas frequency information includes visual information to be displayed with the above described number of documents, etc. compared with the number of documents, etc. in a given unit of time.

The normalizing unit normalizes the document frequency and converts it into an intensity level based on the distribution of the document frequency in a given unit of time such as year, month, day of the week, day, etc. so that the frequency information can be emphasized and displayed according to the document frequency.

The intensity level displaying unit emphasizes and displays information on each output device according to the intensity level obtained from the normalizing unit. The method of emphasizing information can be, for example, changing colors, brightness, density, size, etc. of symbols (including characters) and graphics indicating the frequency.

Year, month, day of the week, or day can be entered through the input device and specified as a unit of time for counting the document frequency. The unit of time indicating the frequency can be optionally switched at any time.

The present invention functions as follows.

First, the relevant date extraction unit checks the expression of the date described in the contents of the document in the free-format electronic documents, automatically extracts the expression of the date through a pattern matching between character strings as date information.

The frequency counting unit counts the number of relevant documents for each piece of date information.

The document frequency display control unit emphasizes and displays the distribution of the number of documents in each unit of time on the output device such as the display device, etc. from the view point of plural units of time such as year/month/day of the week/day, etc.

Each processing unit in the above described processing device is realized by a program performed by the CPU of the processing device, and the program can be stored in an appropriate storage device and then provided therefrom.

BRIEF DESCRIPTION OF THE DRAWINGS

FIG. 1 shows an example of the configuration according to the present invention;

FIG. 2 shows the correspondence between the alphanumeric characters and the Chinese numeric characters;

FIGS. 4A through 4C show examples of date expression patterns in English;

FIGS. 5A through 5D show examples of date expression patterns in Japanese;

FIG. 6 shows an example of another date expression pattern;

FIG. 8 shows an example of a pattern of a value of each element of date expression;

FIG. 9 shows an example of a pattern and a variable of date expression;

FIG. 11 shows an example of a conversion function for use in converting an intensity level into a color;

FIG. 17 shows an example of the configuration when the present invention is applied to a system of visualizing a retrieval result of an entire document retrieval system;

FIG. 18 shows an example of a view;

FIG. 19 shows an example of a view; and

DESCRIPTION OF THE PREFERRED EMBODIMENT

Described below is an example of an embodiment of the present invention.

The relevant date extraction unit 11 extracts date information through a pattern matching between character strings in the date expression in Japanese and English described in the contents of documents.

The process of extracting relevant date information from the contents of documents is performed in the procedure of [1] normalizing numerical expression; [2]) pattern matching; and [3] executing a day-of-week determination routine.

[1] Normalizing Numerical Expression

Figure 2:
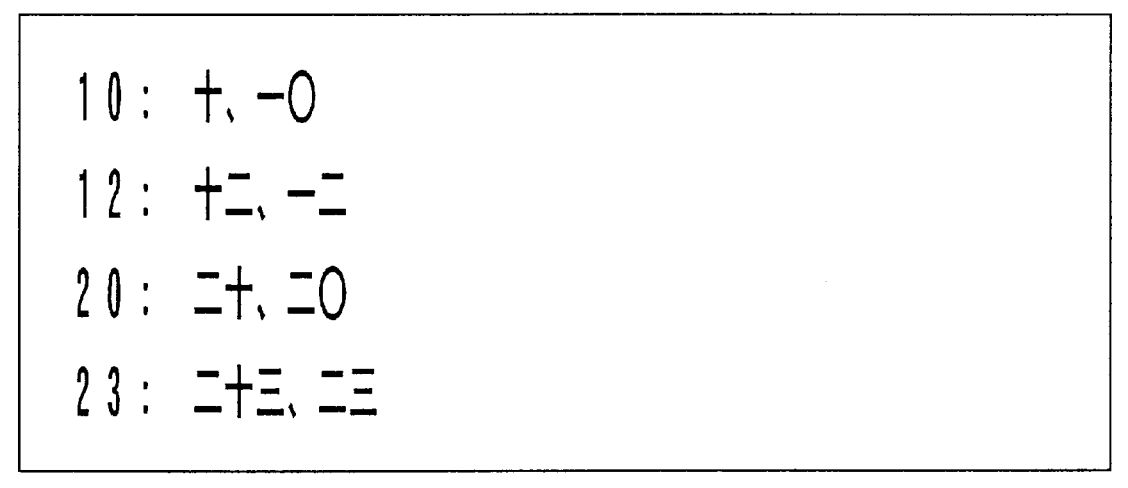
Figure 3:
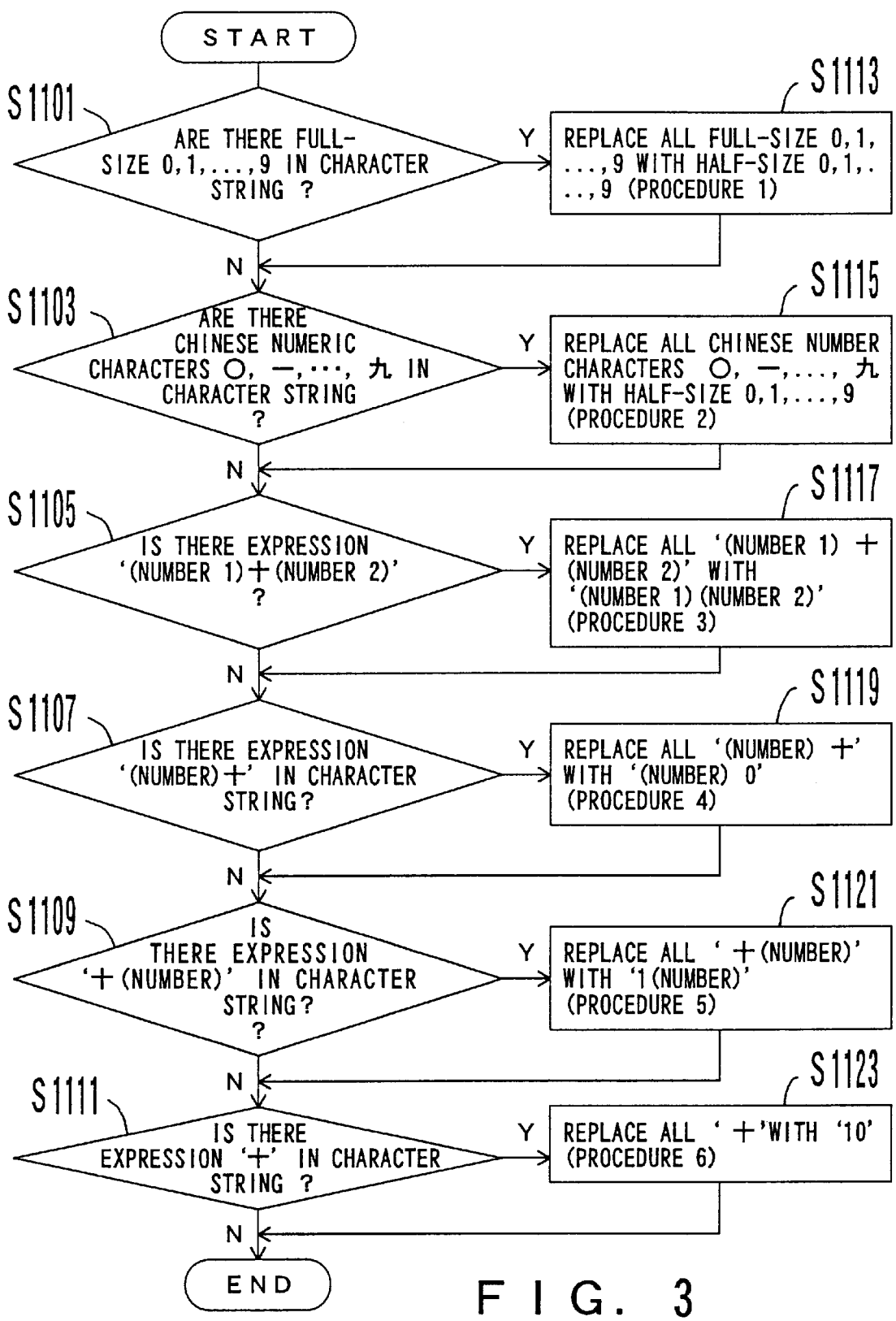
FIG. 3 is a flowchart showing a numeric expression normalizing process.

Numbers in date expression are described in various formats in documents. To efficiently extract date information through a pattern matching, numerical expressions should be normalized before a pattern matching. In Japanese, numbers may be expressed by Chinese numeric characters. The alphanumeric characters 0, 1, 2, 3, 4, 5, 6, 7, 8, and 9 are expressed as o,一,二,三,四,五,六,七,八, and 九 respectively in Chinese numeric characters. When a number is expressed with two digits, a Chinese numeric character is allotted to each digit as with the alphanumeric characters (notation 1). Another expression of a two-digit number with the Chinese numeric characters is to add the character '十' indicating 10 after the higher order digit character in the range from 二 to 九 (if no characters from 二 to 九 are written, it means the higher order digit character is 1). The lower order digit character from o to 九 indicates a corresponding alphanumeric character from 0 to 9 (If no characters are written, it means the lower order digit character is 0) (notation 2). A number with three or more digits can be similarly expressed. (In notation 2, characters 百 and 千 are added to indicate 100 and 1000 respectively). However, further explanation about the Japanese numeric notation is omitted here. FIG. 2 shows an example of the correspondence between the alphanumeric characters and the Chinese numeric characters. For example, the alphanumeric characters 10, 12, 20, and 23 are respectively expressed as 一o, 十二,二o,二三 in the notation 1. In the notation 2, they are expressed as 十,十二,二十, and 二十三 respectively. Therefore, the converting process is performed to unite the numeric expressions in the following procedure. FIG. 3 shows a flowchart indicating this process.

1. Full-size numeric characters 0, 1, . . . , and 9 are replaced with half-size numeric characters 0, 1, . . . , and 9.

2. Full-size Chinese numeric characters o,二, 三,四,五,六, ,八, and 九 are replaced with half-size numeric characters 0, 1, . . . , and 9.

3. Expressions '(numeric character 1) 十 (numeric character 2)' are replaced with expressions '(numeric character 1)(numeric character 2)'.

4. Expressions '(numeric character)十' are replaced with expressions '(numeric character)0'.

5. Expressions '十(numeric character)' are replaced with expressions '1(numeric character)'.

6. All characters '十' are replaced with 10.

Thus, all full-size alphanumeric characters and Chinese numeric characters in date expression in Japanese documents are converted into half-size characters. Such a converting process can be actually performed using a programming language such as Perl. The process of determining the existence of a character string in the flowchart shown in FIG. 3, and the process to be performed when the character string exists can be specified by, for example, a single statement.

[2] Pattern Matching

In a pattern matching process, date expression patterns in English and Japanese are checked with the contents of each document, and all date expressions in matching patterns is retrieved. In this process, corresponding character strings are evaluated in, for example, a programming language Perl based on an evaluation equation into which the patterns shown in FIGS. 8 and 9 are incorporated, and numeric characters indicating date expressions are retrieved when patterns match each other.

If numeric numbers indicating a year are omitted, the year can be figured out as obtained from the last date expression pattern. Without the last date expression pattern, the current year (in which this process is performed) can be recorded. Step S1405 shown in the flowchart in FIG. 10 indicates that the current year is adopted as the omitted year.

FIGS. 4A through 4C, 5A through 5D, and 6 show examples of date expression patterns used in a pattern matching process. FIGS. 4A through 4C show examples of date expression patterns in English. FIG. 4A shows an example of a pattern in a 'day-month-year' format. FIG. 4B shows an example of a pattern in a 'month-day-year' format. FIG. 4C shows an example of a period information pattern.

FIGS. 5A through 5D show examples of date expression patterns in Japanese documents. FIG. 5A shows an example of a period pattern (Meiji(明治), Taisho(大正), Showa(昭和), and Heisei(平成) periods and their initial characters). FIG. 5B shows an example of a general calendar pattern. FIG. 5C shows an example of expressing a period. FIG. 5D shows examples of terms indicating specific time of a month.

The characters of '年', '月', and '日' respectively indicate year, month, and day. A number before each of the characters indicate an actual year, month, or date.

FIG. 6 shows examples of other date expression patterns. In the example of date expression pattern shown in FIG. 6, the date can be expressed in any of the pattern A 'year-month-day', pattern B 'day-month-year', and pattern C 'month-day-year'. Assume that the year is expressed by a two-digit number indicating the two lower order digits of the calendar year. If the date expression is set to indicate a year of 2000s when the digits are in the range from 00 to 49, and is set to indicate a year of 1900s when the digits are in the range from 50 to 99, then the pattern A can be distinguished from the pattern B or C because for the year before 2000 the number is larger than 31. However, the pattern B may not be distinguished from the pattern C. Furthermore, for the year 2000 onwards, patterns cannot be identified. In this case, the date expression can be optionally set depending on the use, for example, to extract all patterns indicating the date corresponding to any point from 10 years before and after the present year. If, for example, the date expression is set to extract all patterns corresponding to the calendar years 1987 through 2007 and the document contains the expression 01/02/03, then the pattern can be Feb. 3 in year 2001 (pattern A), Feb. 1 in year 2003 (pattern B), or Jan. 2 in year 2003 (pattern C), and all these patterns are extracted. If the date expression is set to extract all patterns corresponding to the calendar years 1987 through 2001, then only Feb. 3 in year 01 (pattern A) is extracted for the expression 01/02/03.

[3] Day-of-Week Determination Routine

The day-of-week determination routine is to figure out the day of the week for the expression 'X year Y month Z day' extracted in a pattern matching.

The day of the week can be figured out using a table such as calendars, etc. for the latest several tens of years. However, according to the present embodiment, the day of the week can be figured out for an optional expression of year-month-day by, for example, the following method.

Upon receipt of the data 'y year m month d day' (y indicates a general calendar year), the following equation is solved.

$$YP=(y-1+int((y-1)/4)-int((y-1)/100)+int((y-1)/400))mod7$$

where int(x) indicates the maximum integer not larger than x, and mod7 indicates the residue of the division in which the divisor is 7.

$$\{M1,M2,\ldots,M12\}=\{0,3,3,6,1,4,6,2,5,0,3,5\}$$

The 'dow' in the following equation indicates the day of the week for the date expression 'y year m month d day' where 0 indicates Sunday, 1 indicates Monday, ..., and 6 indicates Saturday.

1. When y year is a leap-year (which is divisible by 400, or is divisible by 4 but not by 100), and m>2;

$$dow=(YP+Mm+d)mod7$$

2. In the other cases;

$$dow=(YP+Mm+d+1)mod7$$

In the descriptions above, the date information is extracted from the date expression in a free-format document. The date information about the information added to a document can be similarly processed.

The process of extracting the above described date information has been improved by adding a day-of-week determination routine to the relevant date extraction routine disclosed by the 'Document Share and Arrangement System, Shared Document Management Apparatus, and Document Access Apparatus' (Japanese Patent Application (Tokuganhei) 8-281940).

Figure 7:
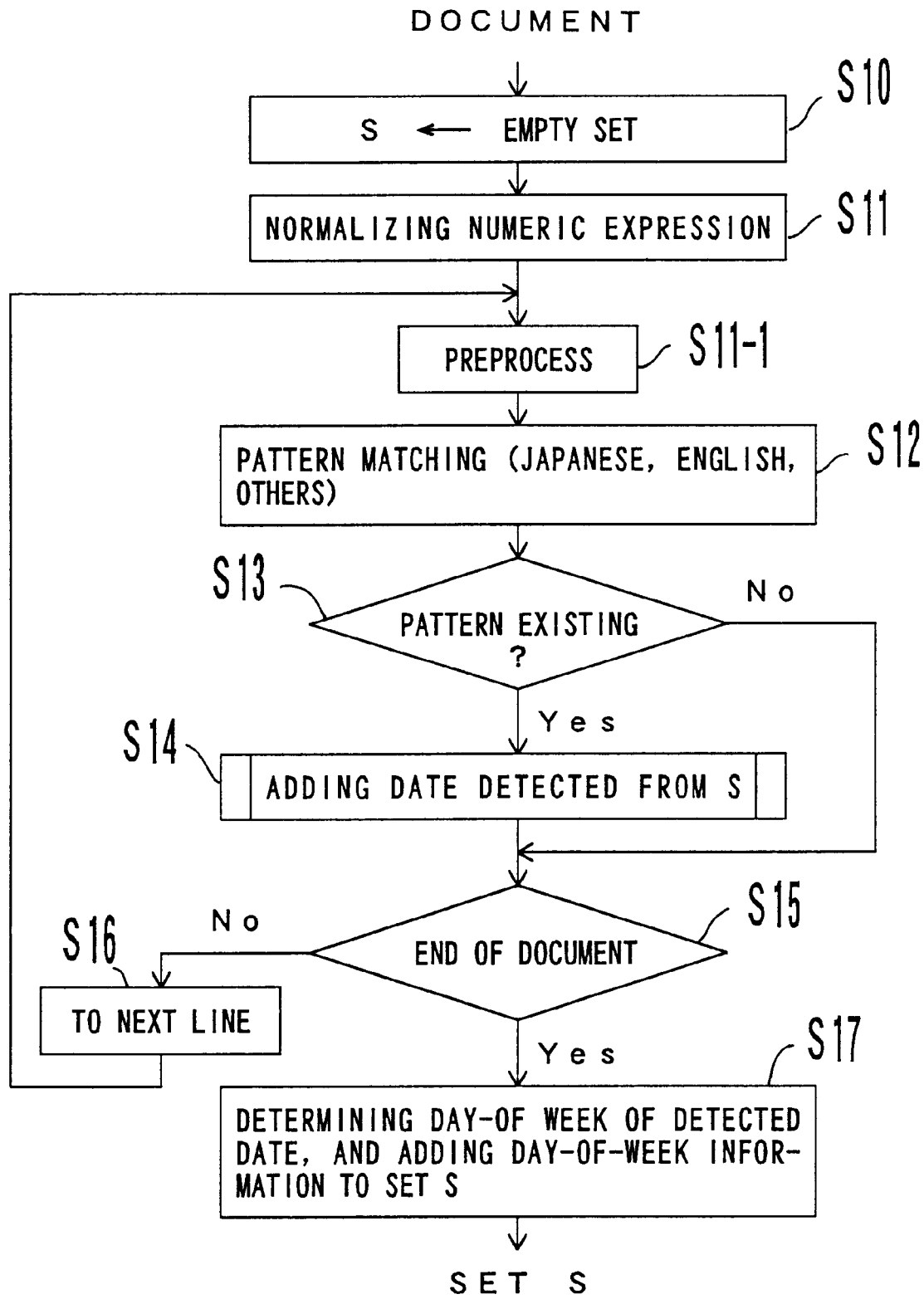
FIG. 7 is a flowchart showing the process performed by the relevant date extraction unit.

FIG. 7 is a flowchart showing the process performed by the relevant date extraction unit.

In step S10, a date set S is an empty set.

In step S11, numeric expressions in a document are normalized. For example, the above described process of normalizing numeric expressions shown in FIG. 3 is performed.

In step S11-1, the space between the year and the month in the date expression is set to 1, and a process of, for example, removing excess information in the date expression is performed as a pre-process of a pattern matching process. The ambiguous descriptions such as '末(end)', '中旬(middle)', etc. in the examples of date expression patterns shown in FIG. 5D can be replaced with, for example, 28 and 15 respectively. This process is also performed in the pre-process.

In step S12, a pattern matching process is performed using a pattern in Japanese, English, and other date expressions for each line in a document. In step S12, for example, the pattern shown in FIG. 8 or 9 is incorporated into the evaluation equation of the programming language Perl as described above to evaluate the character string in each line in the document and retrieve date information which matches the pattern. In FIG. 8, a pattern of a value assignable to each element of date expression is defined. For example, an element '\day' indicates that the pattern can be an integer ranging from 1 to 31. The '\year' can be '\year2' or '\year4', that is, an integer ranging from 1 to 9999. FIG. 9 shows examples of date expression patterns corresponding to most of the English date expression patterns, Japanese date expression patterns, and other date expression patterns shown in FIGS. 4A through 4C, 5A through 5D, and 6. If a portion of a character string in a document matches the pattern of each element such as day, etc., and matches the pattern of a date expression containing a sequence of each element, then a pattern matching is acknowledged, and the values corresponding to the elements enclosed by ( ) in the pattern are copied to the variables G1 (period), Y1 (year), M1 (month), and D1 (day) written to the right of the pattern shown in FIG. 9 (the line—in each variable name indicates no values are copied, and the numeric characters indicate which number, when counted from left, has been actually copied to the variable). In the time pattern, values corresponding to the variables G2, Y2, M2, and D2 are input. For example, when the character string 'Mar. 15, 1997' is written, this pattern matches the first pattern shown in FIG. 9. Therefore, 1997 is input to the variable Y1, Mar. is input to M1, and 15 is input to D1. In this case, G1 is empty. The process in step S12 is thus performed. However, the above described explanation relating to FIGS. 8 and 9 simply shows an example of the concept, and can be obtained by other languages and methods. Thus, the pattern matching according to the present invention should not be limited to the above described methods.

It is determined in step S13 whether or not a matching pattern exists in the date expression in the line in a document by checking, for example, whether or not the above described variable contains a value. If a matching pattern exists, then control is passed to step S14. If no matching patterns exist, control is passed to step S15.

Figure 10:
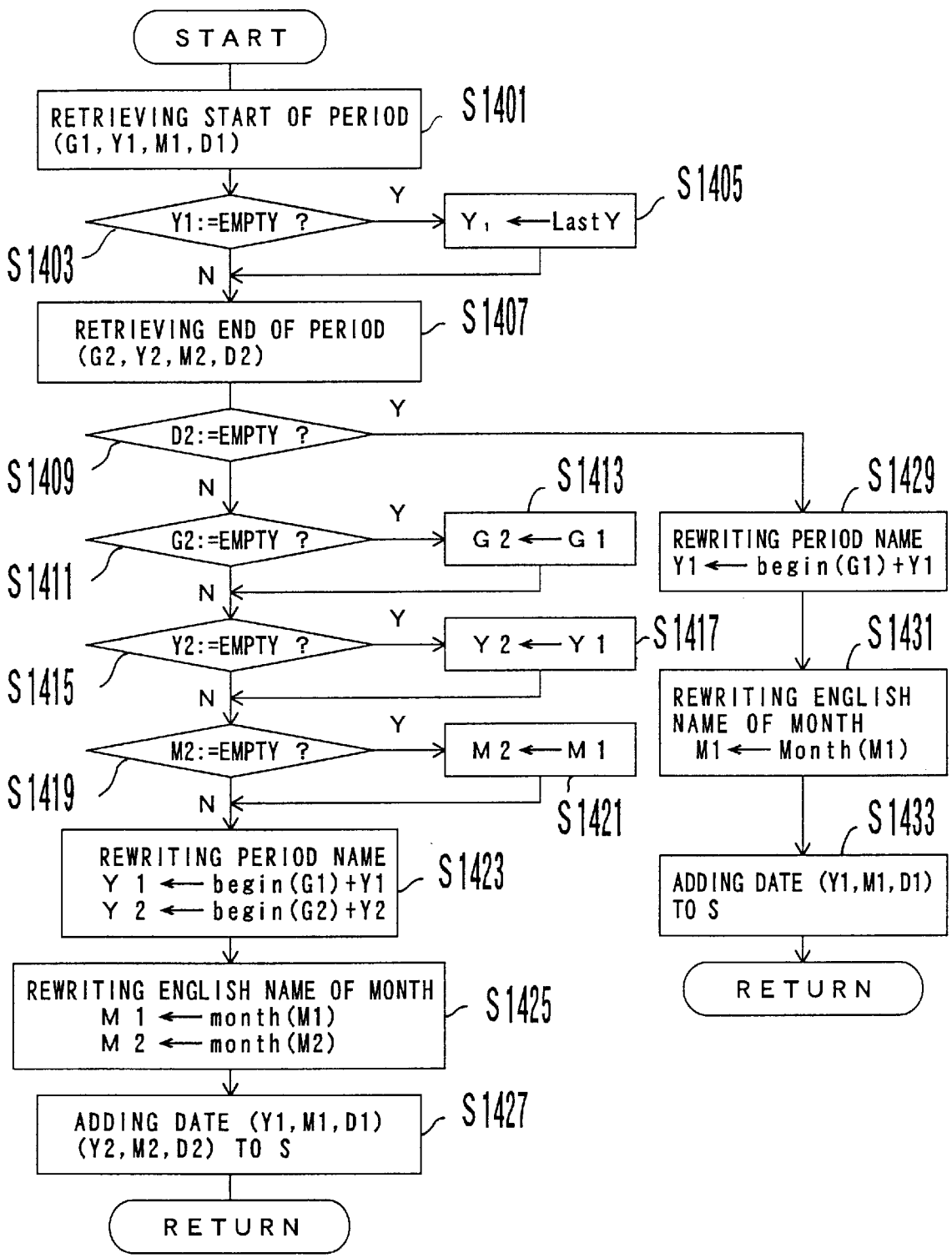
FIG. 10 is a flowchart showing the process of adding date information to a set S.

In step S14, a detected date is added to the set S. However, if the date has already been added to the set S in the same document, then the date is not added. If a detected date is different from the already added date, then it is added. The number of added dates is not limited as long as a detected date is new (the description of the determining process is omitted here). FIG. 10 is a detailed flowchart showing the process. In step S1401, the start of the period (G1,Y1,M1,D1) obtained in the previous pattern matching is retrieved. If Y1 is empty (S1403), the current year (LastY) is copied to Y1 (S 1405). Then, end of period (G2,Y2,M2,D2) is retrieved in S1407. If D2 is empty, (S1409), the calendar year is obtained from G1 and Y1 using the function begin( ) and stored in Y1 (S1429). The name of the month in English is converted into a numeric expression using the function month( ) and stored in M1 (S1431). Finally, in S1433, the date (Y1,M1,D1) is added to the set S. In this step, the function begin (name of period) returns the calendar year of the first year of the period—1. For example, begin (Showa) returns 1925, begin (Heisei) returns 1988, and 0 is returned when a period name is not entered. The function month (name of month in English) returns the numeric expression of the month corresponding to the name of the month. For example, month (Jan.) returns 1, month (April) returns 4, and when a numeric character is entered, the character is returned as is. If D2 is not empty, and if any of G2, Y2, and M2 is empty, then G1, Y1, and M1 are copied to a corresponding empty portion in S1411 through S1421. Then, a calendar year is stored in each of Y1 and Y2 (S1423), numeric characters indicating months are stored in M1 and M2 (S1425), and two dates (Y1,M1,D1) and (Y2, M2,D2) are added to the set S (S1427).

In step S15, it is determined whether or not the end of the document has been reached. If the end of the document has not been reached, control is passed to the process in step S16. If the end of the document has been reached, control is passed to the process in step S17.

In step S16, control is passed to the next line in the document, and the processes in and after step S11-1 are repeated until the end of the document is reached.

In step S17, the day of the week is determined for the detected date, and the day-of-week information is added to the set S. That is, the added record includes at least a field containing the above described date information (4-digit information indicating a calendar year, month, and day) and day-of-week information.

[Frequency Counting Unit]

The frequency counting unit 12 counts the number of corresponding documents for all dates extracted by the relevant date extraction unit 11 in order to generate the frequency data 13. yf(X) indicates the number of documents dated X year. mf(X,Y) indicates the number of documents dated Y month in X year. wf(U) indicates the number of documents on U day of the week. df(X,Y,Z) indicates the number of documents dated Z day, Y month in X year.

The number of documents are counted for the data dated Z day, Y month in X year, (U day of week) as follows.

1. in a year unit: yf(X) ++
2. in a month unit: mf(X,Y) ++
3. in a day-of-week unit: wf(U) ++
4. in a day unit: df(X,Y,Z) ++

(where ++ indicates the increment of the number of documents by 1)

If the date information refers to a period, the counting process is performed on both start and end of the period. MaxDyf indicates the maximum value of yf(X) in the time block D. MinDyf indicates the minimum value of yf(X) larger than 0. MinDyf can contain 0 depending on the type of conversion function described later.

[Document Frequency Display Control Unit]

The document frequency display control unit 14 emphasizes and displays the document frequency on the display screen in, for example, year, month, day-of-week, and day units at a request from the user. To easily obtain the distribution of the document frequency, the frequency is converted into a color, density, etc. to indicate the intensity level on the display device.

For example, when the frequency is displayed as a color chart, it is first converted into colors ranging from warm colors to cool colors. When the frequency is displayed on a monochrome display device, the frequency can be displayed as a change in density (brightness). In addition to the color and density, the font and size of a displayed character can be changed for display depending on the frequency. At a request from the user, the frequency is displayed with the display unit year/month/day-of-week/day of switched for display.

The control of document frequency display can be performed in the procedure of [1] converting a frequency into an intensity level (normalization) and [2] displaying an intensity level.

[1] Converting a Frequency into an Intensity Level (normalization)

The normalizing unit 15 generates a frequency-intensity normalization function from the maximum and minimum values of the document frequency in a time length specified by the user. Using the normalization function, the frequency is converted into an intensity level. The intensity level refers to a real number [0, 1] (that is, $0 \leq$ intensity level $\leq 1$).

Practically, a frequency is converted into an intensity level as follows. According to the time length D specified by the user, the frequency range with a non-negative integer (for example, the range [MinDyf, MaxDyf]) is normalized into a real number of the intensity level [0, 1]. A conversion function can be expressed by a function Conv (f, min, max) where f indicates the frequency, min (=MinDyf) indicates the minimum value of the frequency, and max (=MaxDyf)

indicates the maximum value of the frequency. The Conv (f, min, max) can be variable depending on the use and a converting method as long as it is a monotonic increment function. That is, if f1≦f2, a monotonic increment function is expressed by the following equation.

Conv (f1, min. max)≦Conv (f2, min, max)

For example, the following function is applicable.
1. Linear Conversion

Conv (f, min, max)=(f−min)/(max−min)

This linear conversion is performed when the frequency is even.
2. Logarithm Conversion Conv. (f, min, max)=log(f−min+1)/log(max−min+1)

A logarithm conversion is applicable when there is quite a difference between the maximum and minimum values, for example, when the maximum and minimum values are expressed by different number of digits, especially when the maximum value fluctuates.

Such a conversion function can be automatically selected by the system depending on the distribution of the frequency, or the user can select the conversion function from the menu on the screen.

[2] Displaying an Intensity Level

The intensity level displaying unit 16 displays the document frequency based on the intensity level. That is, the intensity level of the real number [0, 1] is displayed after changing the color or density depending on an output device. If a 24-bit color CRT is specified as the output device, the intensity level is displayed as follows.

1. Displaying an intensity level with colors Displaying an intensity level with colors refers to the continuous variation in colors, for example, from cool colors to warm colors such as 'blue—green—yellow—red' to be converted into the variation in intensity level. If the colors R, G, and B are individually expressed by 8 bits (256 bits at maximum), the intensity of each color for the intensity level e can be expressed by the conversion function as shown in FIG. 11.

Figure 12:
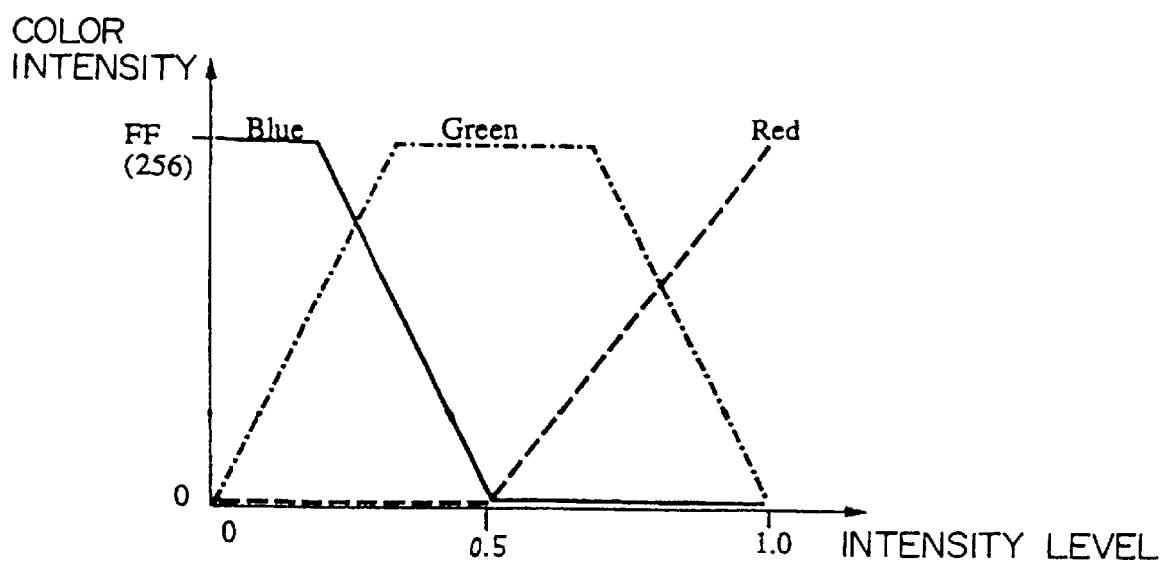
FIG. 12 shows a conversion correspondence between the intensity level and a color change.

FIG. 12 shows the correspondence in conversion between an intensity level and a color. According to the function shown in FIG. 11, the intensity level 0 outputs blue, the intensity level between 0 and 0.5 outputs the combination of blue and green, the intensity level 0.5 outputs green, the intensity level between 0.5 nd 1.0 outputs the combination of green and red, and the intensity level 1.0 outputs red as shown in FIG. 12.

2. Displaying an Intensity Level with Density

If an intensity level is expressed by a variation of density, not by a variation of color, the density corresponds to intensity levels as follows.

red(e)=blue(e)=green(e)=256(1−e)

With such functions, the correspondence between white (256 for each of the R, G, and B) and black (0 for each of the R, G, and B) can be expressed.

[3] Switching a Display Unit

Display units are switched among year, month, day-of-week, and day.
1. Display in a Year Unit Assuming that the user specifies a set X {X1, X2, . . . , Xn} for a specific year, the correspondence between X and yf(X) is displayed. Normally, the X in the period for which yf(X) is defined is to be processed.

Figure 13:
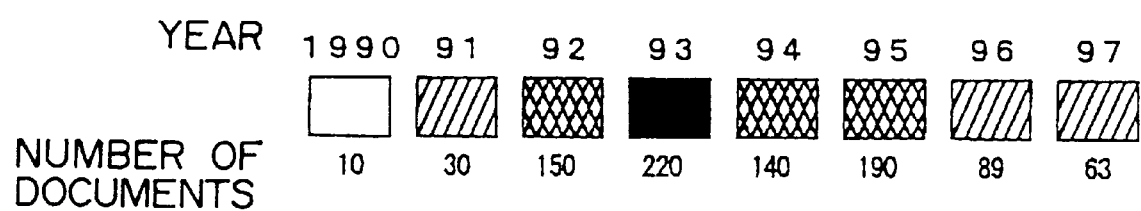
FIG. 13 shows an example of an expression in a year unit.

FIG. 13 shows an example of a display in a year unit. A year and an intensity level is displayed in a one-dimensional array. The transition of the distribution of the number of documents can be recognized in a year unit by displaying an intensity level with a color or a density level modified. In FIG. 13, a higher document frequency in a year is displayed in a higher density. As a result, the frequency (number) of a document group in each year can be easily obtained. That is, the transition of the number of the documents, which peaks in '93, can be easily recognized.

2. Display in a Month Unit

Assuming that the user specifies a set (Y,M) {(y1, m1), (y2, m2), . . . (yn, mn)} for a combination of (year, month), the correspondence between Y,M and mf(Y,M) is displayed. Normally, the (Y,M) in the period for which mf is defined is to be processed.

Figure 14:
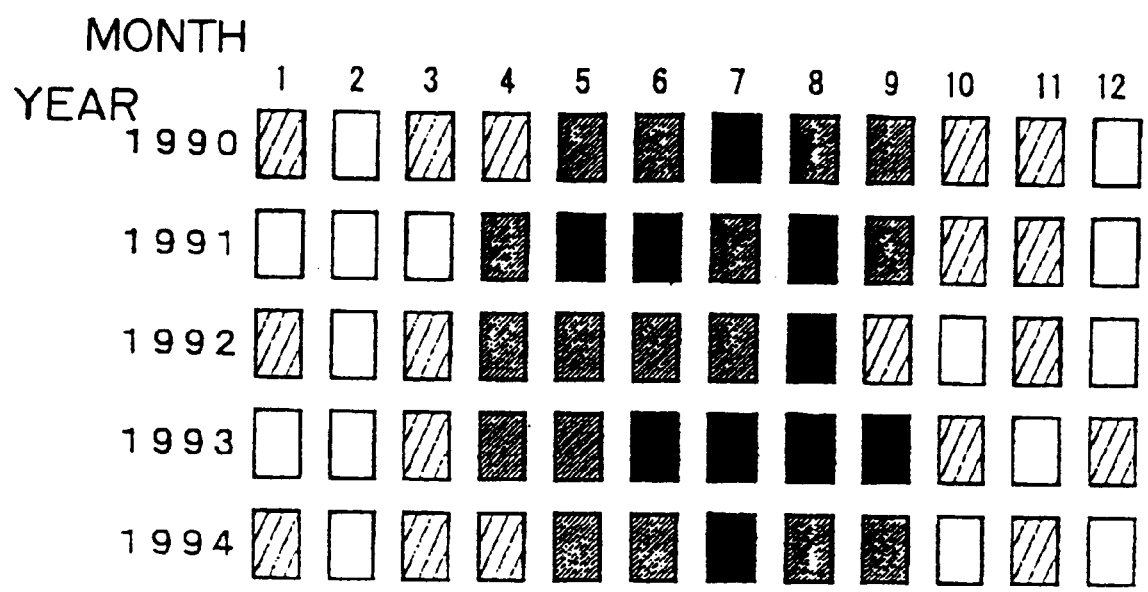
FIG. 14 shows an example of an expression in a month unit.

FIG. 14 shows an example of a display in a month unit. A year and a month are displayed in a two-dimensional array. The transition of the distribution of the number of documents can be recognized in a year unit and a month unit by displaying an intensity level with a color or a density level modified. For example, FIG. 14 shows that the frequency of an object document becomes higher in summer every year.

3. Display in a Day-of-Week Unit

Figure 15:
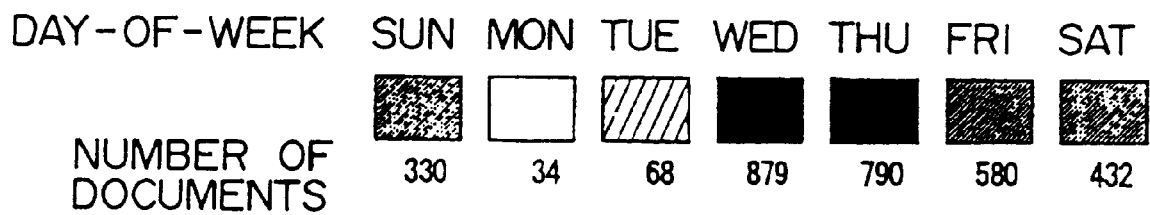
FIG. 15 shows an example of an expression in a day-of-the-week unit.

As shown in FIG. 15, a day of the week and an intensity level are displayed in a one-dimensional array for the document frequency in a time length specified by a user. Thus, the distribution of the number of documents for each day of the week can be easily recognized. For example, FIG. 15 shows that the frequency of a document is high in the middle of a week.

4. Display in a Day Unit

Figure 16:
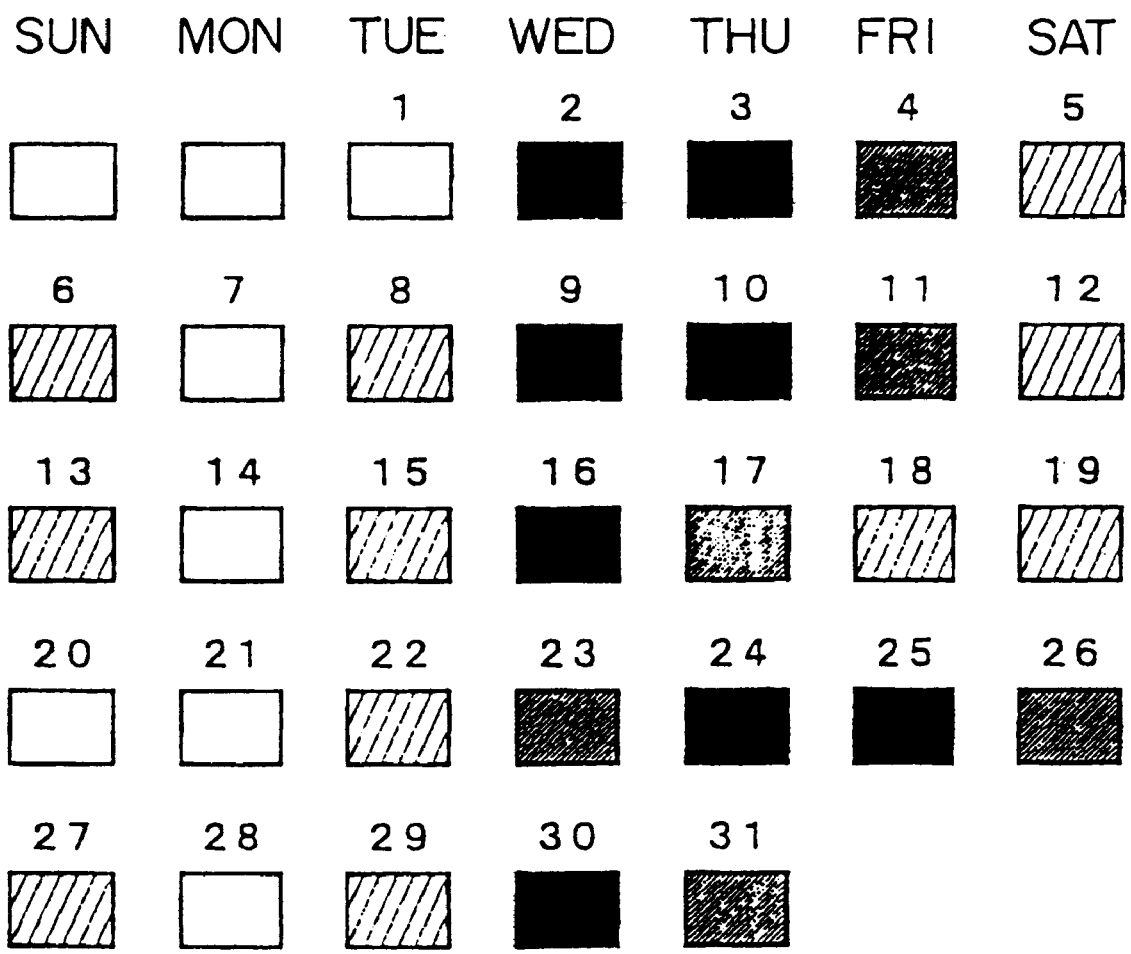
FIG. 16 shows an example of an expression in a day unit.

As shown in FIG. 16, a calendar for M month in Y year specified by the user displays the document frequency for the month in a day unit. Thus, the frequency of the number of documents can be easily recognized in a month. For example, FIG. 16 shows that the frequency of a document is high in the middle of a week, or that the frequency of a document is high around the end of a month.

The present invention is applicable to a free-format common document such as a text file, etc. Therefore, it can be easily applied to, for example, a file system of an operating system (OS).

Described below is an embodiment in which the present invention is incorporated into an existing information processing system such as an information retrieval system, groupware, etc.

[1] System for Visualizing a Retrieval Result in an Information Retrieval System An entire document searching process can be performed, for example, as a method of retrieving free-format documents in home pages of the Internet. However, a matching character string does not always indicate a document to be obtained, that is, a retrieval result may contain a noise. Furthermore, the number of obtained documents is considerably large because a total number of documents to be searched is very large, and similar words are retrieved using OR to avoid mis-retrieval, etc. To retrieve effective information from a large volume of noisy retrieval results, it is requested that retrieval results should be appropriately visualized.

The present invention can be applied in visualizing such retrieval results. Practically, the present invention is applied to a plurality of free-format documents obtained as a retrieval result from entire documents. The retrieval result is visualized by displaying the document frequency in an intensity level. FIG. 17 shows an example of the configuration when the present invention is applied as a system of visualizing a retrieval result of the entire retrieval system.

Assume that a database retrieval engine 21 shown in FIG. 17 searches the entire articles (database 22) in a newspaper over a five year period.

At a retrieval request from a user, the database retrieval engine 21 searches in the entire database 22, and provides a corresponding retrieval result for the document display device of the present invention.

The relevant date extraction unit 11 obtains the retrieval result (from a plurality of documents), extracts, through a pattern matching process, date information from a date expression described in a document. The frequency counting unit 12 stores all document numbers relating to each date information, counts the number of the documents, and outputs the result as the frequency data 13. The document frequency display control unit 14 emphasizes and displays the distribution of the number of documents in each unit of year/month/day-of-week/day, etc. according to the user's specification, and the summary list of the document information if required (for example, the lower portion of the display in FIGS. 18 and 19) on an output device to allow the user to view the displayed information.

In this example, the data is output in a month unit and in a day unit. Since the retrieval object is a newspaper article, the document frequency is not extremely uneven. As a result, a linear conversion is adopted as a normalization conversion, and intensity levels are displayed as color variations (warm and cool colors).

When the user selects a month cell in displaying data in a month unit by clicking a mouse button, etc. for the cell, data is displayed in a day unit for a corresponding month. Thus, the entire tendency is obtained according to the data displayed in a month unit. Furthermore, a more detailed tendency is obtained according to the data displayed in a day unit. Then, by referring to the document number in the frequency data 13, access is gained to the retrieval result itself. Thus, according to the present invention, a retrieval result is displayed with the unit of display data changed at an instruction of the user, and the user can easily recognize retrieval results from plural time points.

FIGS. 18 and 19 show examples of displayed data according to an embodiment of the present invention.

FIG. 18 shows the data displayed in a month unit as a retrieval result of articles containing a character string 'food poisoning'. According to the displayed data, articles about food poisoning frequently appear in summer. When a condition is set to further limit the retrieval results, a limiting condition is transmitted to the database retrieval engine 21 as in the common database retrieval process.

FIG. 19 shows an example of displaying the retrieval results about articles containing 'highway' and 'traffic congestion' as data displayed in a day unit for April in 1990. According to the displayed data, the articles about the traffic congestion on highways frequently appear on weekends and on days before holidays.

[2] System of Visualizing Shared Documents in a Document Share and Arrangement System (groupware)

An object of groupware is to share document information of each user. The present invention is applicable in visualizing the document information of the groupware.

Practically, the present invention can be used with the document share and arrangement system according to the 'Document Share and Arrangement System, Shared Document Management Apparatus, and Document Access Apparatus' (Tokuganhei 8-281940) in order to accumulate the documents and utilize them more effectively with the document share and arrangement system.

First, the 'Document Share and Arrangement System, Shared Document Management Apparatus, and Document Access Apparatus' (Tokuganhei 8-281940) is described below.

This document share and arrangement system is a system for sharing documents through a network such as an Internet (Intranet), etc. With this system, a user can enter information considered to be useful for the user together with additional information in a sharing machine of a group in a simple operation. The information about documents are arranged and presented, and can be updated.

Figure 20:
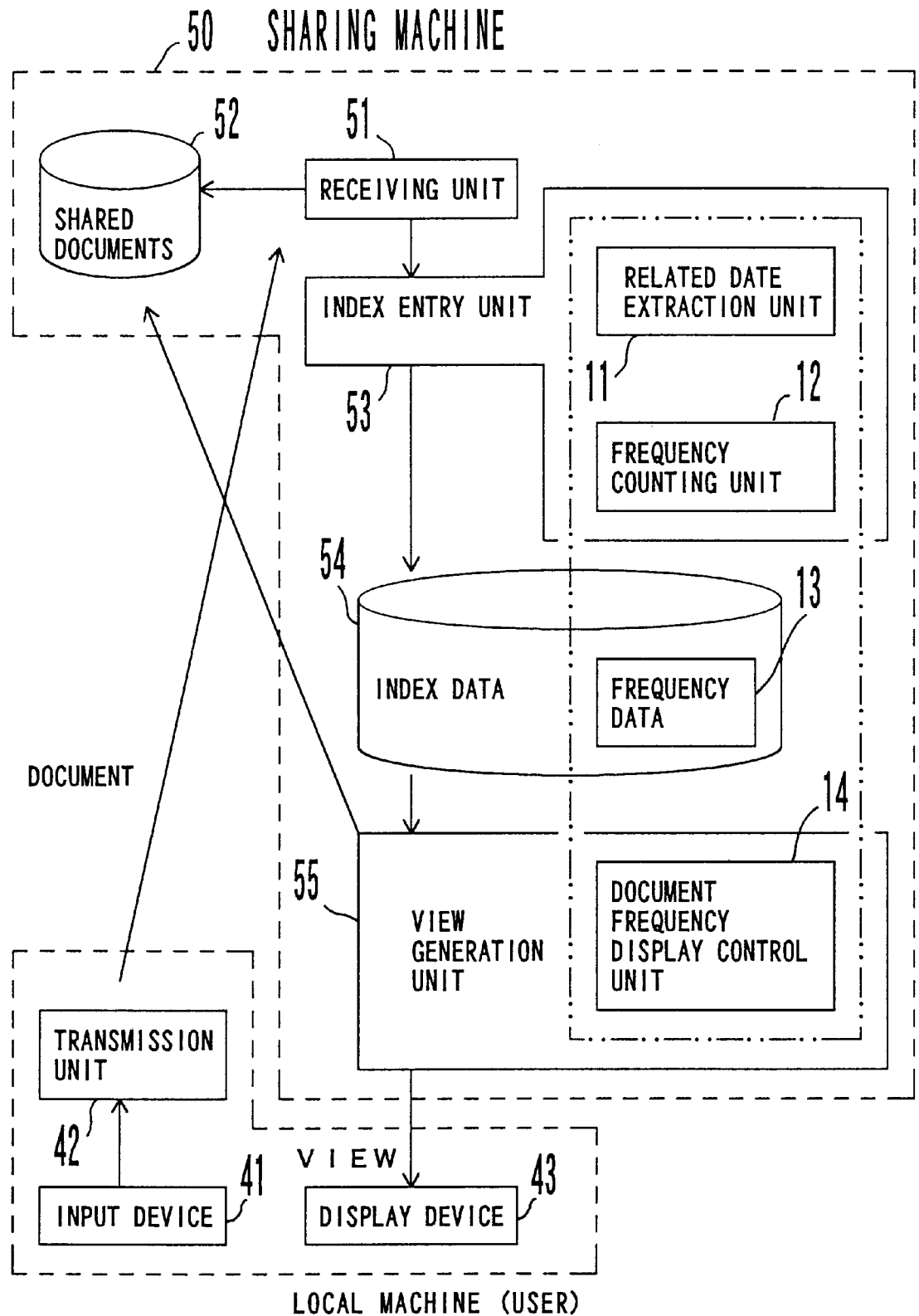
FIG. 20 shows an example of the configuration when the present invention is applied to a system of visualizing a shared documents of a document share and arrangement system.

FIG. 20 shows an example of the configuration in which the present invention is applied as a system for visualizing shared documents of a document share and arrangement system.

A local machine 40 converts a document input and edited by an input device 41 into a predetermined document structure, and transmits it to a sharing machine 50 through a network.

The sharing machine 50 assigns a document ID to a received document through a receiving unit 51, and transmits the document ID, etc. to an index entry unit 53. The index entry unit 53 enters the document ID, etc. in an index data 54. A view generation unit 55 arranges a plurality of documents at a specified time or according to access by a user to any of the documents, and presents to a display device 43 the documents or their index data accumulated in the shared documents 52 as the displayed data (view) automatically arranged at a specified time or according to the access by the user.

According to the present embodiment, the frequency data indicating the document frequency for each date of the documents is added to the index data 54, and the view generation unit 55 displays the frequency information of the documents in a unit of time such as year/month/day-of-week/day, etc. as a view (visualized data) of the shared documents 52.

Therefore, the relevant date extraction unit 11 and the frequency counting unit 12 according to the present invention are incorporated into the index entry unit 53 to manage the frequency data 13 as part of the index data 54. At this time, the index data comprises at least date information (calendar year in 4 digits, month, and day), day-of-week information, and a record including all the above described document IDs relevant to the date. The index data refers to a concept including a field of an index key and all other fields.

The view generation unit 55 displays the frequency information in a unit of time such as year/month/day-of-week/day, etc. through the document frequency display control unit 14 at a request for the document frequency through the local machine 40.

Thus, the shared documents 52 can be furthermore easily checked by applying the present invention in generating a view when documents entered by a group member (user) are shared.

As described above, the present invention has the following effects.

1. There are a great number of free-format documents such as text files, etc. The distribution of the documents can be visualized in a time series.

2. Since the frequency of a document for each date is visualized by changes in density and color, the transition and change of the frequency can be quickly checked. Especially, a change of a specified subject in a time series can be checked by using a retrieval system.

3. The date relevant to a document is automatically extracted corresponding to documents in Japanese and English. The present invention can be applied to most of the documents normally accessible by the user, and can also be applied to the documents written in other languages by adding date expression patterns of respective languages.

4. In addition to the text files, the present invention can be applied to a retrieval result of an entire search in a document and to shared documents of groupware.

5. The document frequency displaying process can be performed on formatted data.

What is claimed is:

1. A document display apparatus for displaying information of electronic documents, comprising:

a date information extraction unit extracting date information, which is expressed in a variety of forms, from contents of each document of the electronic documents;

a frequency counting unit counting a frequency of documents including any date in each time interval of a given unit of time by referring to the extracted date information; and a document frequency display control unit displaying frequency information representing the counted frequency of documents in each time interval of the unit of time.

2. The document display apparatus according to claim 1, wherein said date information extraction unit automatically extracts the date information described in contents of the documents through a pattern matching process.

3. The document display apparatus according to claim 1, further comprising:

an input unit specifying a unit of time, such as year, month, day-of-week, or day, at which the frequency information is displayed, wherein said frequency counting unit counts a frequency of documents in the unit of time specified by said input unit: and said document frequency display control unit displays the frequency information in the unit of time specified by said input unit.

4. The document display apparatus according to claim 1, further comprising:

an input unit specifying a start and an end of a time length in displaying the frequency information, wherein said frequency counting unit counts a frequency of documents in the unit of time for the time length specified by said input unit: and said document frequency display control unit displays the frequency information in the unit of time for the time length specified by said input unit.

5. The document display apparatus according to claim 4, wherein said start and end of the time length specified by said input unit are expressed by year, month, day-of-week, day, or a combination thereof.

6. The document display apparatus according to claim 1, wherein said document frequency display control unit normalizes a frequency of each document based on a distribution of the frequency of the documents in the unit of time, converts the normalized frequency into an intensity level, and displays the frequency information based on the intensity level.

7. The document display apparatus according to claim 1, wherein said document frequency display control unit computes an intensity level by switching automatically or at a request from a user, a conversion function for use in converting the frequency of the documents into the intensity level.

8. The document display apparatus according to claim 6, wherein said document frequency display control unit displays the frequency information of the documents in the unit of time by changing color, brightness, or size of symbols or graphics based on the computed intensity level.

9. The document display apparatus according to claim 7, wherein said document frequency display control unit displays the frequency information of the documents in the unit of time by changing color, brightness, or size of symbols or graphics based on the computed intensity level.

10. The document display apparatus according to claim 1, wherein said frequency information comprises the frequency of the documents or visual information obtained based on the frequency of the documents.

11. A document display apparatus used in a system capable of searching a database relating to documents, comprising:

a date information extraction unit extracting date information, which is expressed in a variety of forms, from contents of each document searched for in the database;

a frequency counting unit counting a frequency of documents including any date in each time interval of a given unit of time by referring to the extracted date information; and a document frequency display control unit displaying frequency information representing the counted frequency of documents in each time interval of the unit of time.

12. The document display apparatus according to claim 11, wherein said frequency information comprises the frequency of the documents or visual information obtained based on the frequency of the documents.

13. A document display apparatus to be used in a system which shares documents through a network, comprising: means for accumulating shared documents after assigning respective identifiers to the documents; index entry means for entering an index of a shared document; and view generation means for visualizing information about the shared document based on the entered index, wherein said index entry means comprises relevant date extraction means for extracting date information relevant to each document in a plurality of shared documents; and frequency counting means for counting the frequency of relevant documents in a unit of time according to the extracted date information wherein a counting result is entered as an index data; and said view generation means comprises document frequency display control means for displaying the counting result entered as an index data and frequency information about a document in a unit of time based on the counting result in a unit of time.

14. The document display apparatus according to claim 13, wherein said frequency information comprises the frequency of the documents or visual information obtained based on the frequency of the documents.

15. A method for displaying information of electronic documents, comprising:
- a date information extracting step for extracting date information which is expressed in a variety of forms, from contents of each document of the electronic documents;
- a frequency counting step for counting frequency of documents including any date in each time interval of a given unit of time by referring to the extracted date information; and
- a document frequency displaying step for displaying frequency information representing the counted frequency of documents in each time interval of the unit of time.

16. The method according to claim 15, wherein
said date information extracting step automatically extracts the date information described in contents of the documents through a pattern matching process.

17. The method according to claim 15, further comprising:
- an inputting step for inputting a unit of time, such as year, month day-of-week, or day, at which the frequency information is displayed, wherein
  - said frequency counting step counts a frequency of documents in the unit of time input by said inputting step; and
  - said document frequency displaying step displays the frequency information in the unit of time input by said inputting step.

18. The method according to claim 15, further comprising:
- an inputting step for inputting a start and an end of a time length in displaying the frequency information; wherein
  - said frequency counting step counts a frequency of documents in the unit of time for the time length input by said inputting step; and
  - said document frequency displaying step displays the frequency information in the unit of time for the time length input by said inputting step.

19. The method according to claim 18, wherein
said start and end of the time length input by said inputting step are expressed by year, month, day-of-week, day, or a combination thereof.

20. The method according to claim 15, wherein
said document frequency displaying step normalizes a frequency of each document based on a distribution of the frequency of the documents in the unit of time, converts the normalized frequency into an intensity level, and displays the frequency information based on the intensity level.

21. The method according to claim 15, wherein
said document frequency displaying step computes an intensity level by switching, automatically or at a request from a user, a conversion function for use in converting the frequency of the documents into the intensity level.

22. The method according to claim 20, wherein
said document frequency displaying step displays the frequency information in the unit of time by changing color, brightness, or size of symbols or graphics based on the computed intensity level.

23. The method according to claim 21, wherein
said document frequency displaying step displays the frequency information in the unit of time by changing color, brightness, or size of symbols or graphics based on the computed intensity level.

24. The method according to claim 15, wherein
said frequency information comprises the frequency of the documents or visual information obtained based on the frequency of the documents.

25. A document displaying method used in a system capable of searching a database relating to documents, comprising:
- a date information extracting step for extracting date information, which is expressed in a variety of forms, from contents of each document searched for in the database;
- a frequency counting step for counting a frequency of documents including any date in each time interval of a given unit of time by referring to the extracted data information; and
- a document frequency displaying step for displaying frequency information representing the counted frequency of documents in each time interval of the unit of time.

26. The document displaying method according to claim 25, wherein
said frequency information comprises the frequency of the documents or visual information obtained based on the frequency of the documents.

27. A document display method for sharing documents through a network and displaying information about the documents, comprising: a step for accumulating shared documents after assigning respective identifiers to the documents; an index entry step for entering an index of a shared document; and a view generating step for visualizing information about the shared document based on the entered index, wherein
- said index entering step comprises a relevant date extracting step for extracting date information relevant to each document in a plurality of shared documents; and a frequency counting step for counting the frequency of relevant documents in a unit of time according to the extracted date information wherein a counting result is entered as an index; and
- said view generating step comprises document frequency displaying step for displaying the counting result entered as an index and frequency information about a document in a unit of time based on the counting result.

28. The document display method according to claim 27, wherein
said frequency information comprises the frequency of the documents or visual information obtained based on the frequency of the documents.

29. A computer-readable storage medium used to direct a computer to perform the functions of:
- extracting date information, which is expressed in a variety of forms, from contents of each document of electronic documents;
- counting a frequency of documents including any date in each time interval of a given unit of time by referring to the extracted date information; and
- displaying frequency information representing the counted frequency of documents in each time interval of the unit of time.

30. A computer-readable storage medium used to direct a computer to perform the functions of:

extracting date information, which is expressed in a variety of forms, from contents of each document searched for in a database relating to documents;

counting a frequency of documents including any date in each time interval of a given unit of time by referring to the extracted date information; and displaying frequency information representing the counted frequency of documents in each time interval of the unit of time.

31. A computer-readable storage medium used to direct a computer to perform the functions of:

accumulating shared documents after assigning respective identifiers to the documents; entering an index of a shared document; and generating a view for visualizing information about the shared document based on the entered index, wherein said index entering function comprises a relevant date extracting process for extracting date information relevant to each document in a plurality of shared documents; and a frequency counting process for counting the frequency of relevant documents in a unit of time according to the extracted date information wherein a counting result is entered as an index; and said view generating function comprises a document frequency displaying process for displaying the counting result entered as an index and frequency information about a document based on the counting result in a unit of time.

32. A document display apparatus for displaying information of electronic documents, comprising:

date information extraction means for extracting date information, which is expressed in a variety of forms, from contents of each document of the electronic documents;

frequency counting means for counting a frequency of documents including any date in each time interval of a given unit of time by referring to the extracted date information; and document frequency display control means for displaying frequency information representing the counted frequency of documents in each time interval of the unit of time.

33. A document display apparatus used in a system capable of searching a database relating to documents, comprising:

date information extraction means for extracting date information, which is expressed in a variety of forms, from contents of each document searched for in the database;

frequency counting means for counting a frequency of documents including any date in each time interval of a given unit of time by referring to the extracted date information; and document frequency display control means for displaying frequency information representing the counted frequency of documents in each time interval of the unit of time.

34. A document display apparatus to be used in a system which shares documents through a network, comprising: a unit accumulating shared documents after assigning respective identifiers to the documents; an index entry unit entering an index of a shared document; and a view generation unit visualizing information about the shared document based on the entered index, wherein said index entry unit comprises a date information extraction unit extracting date information, which is expressed in a variety of forms, from contents of each document in a plurality of shared documents; and a frequency counting unit counting a frequency of documents including any date in each time interval of a given unit of time by referring to the extracted date information, wherein the counting result is entered as an index data; and said view generation unit comprises a document frequency display control unit displaying the counting result entered as an index data and frequency information representing the counted frequency of documents in each time interval of the unit of time.

* * * * *